УС008739911B2

(12) United States Patent
Katou et al.

(10) Patent No.: US 8,739,911 B2
(45) Date of Patent: Jun. 3, 2014

(54) STRUCTURE FOR MOUNTING POWER SUPPLY DEVICE IN VEHICLE

(71) Applicant: Honda Motor Co., Ltd, Tokyo (JP)

(72) Inventors: Takashi Katou, Wako (JP); Junichi Kojima, Wako (JP); Sadayuki Asano, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/834,546

(22) Filed: Mar. 15, 2013

(65) Prior Publication Data

US 2013/0277130 A1    Oct. 24, 2013

(30) Foreign Application Priority Data

Apr. 18, 2012    (JP) .................. 2012-095051

(51) Int. Cl.
*B60R 16/04*    (2006.01)
(52) U.S. Cl.
USPC ........................................ 180/68.5
(58) Field of Classification Search
USPC ...................... 180/68.5, 68.2, 68.1
See application file for complete search history.

(56) References Cited

U.S. PATENT DOCUMENTS

| 7,004,233 | B2 * | 2/2006 | Hasegawa et al. | 165/47 |
| 7,556,113 | B2 * | 7/2009 | Amori et al. | 180/68.5 |
| 7,654,351 | B2 * | 2/2010 | Koike et al. | 180/68.5 |
| 7,905,307 | B2 * | 3/2011 | Kubota et al. | 180/68.1 |
| 8,276,696 | B2 * | 10/2012 | Lucas | 180/68.2 |
| 8,430,194 | B2 * | 4/2013 | Yamatani | 180/68.1 |
| 8,453,778 | B2 * | 6/2013 | Bannier et al. | 180/68.5 |
| 8,567,543 | B2 * | 10/2013 | Kubota et al. | 180/68.5 |
| 8,584,779 | B2 * | 11/2013 | Tsuchiya et al. | 180/68.5 |
| 2003/0186115 | A1 * | 10/2003 | Shibasawa et al. | 180/68.5 |
| 2012/0175177 | A1 * | 7/2012 | Lee et al. | 180/68.5 |
| 2013/0037337 | A1 * | 2/2013 | Auer et al. | 180/68.5 |

FOREIGN PATENT DOCUMENTS

| JP | 11-139348 A | 5/1999 |
| JP | 2009-274665 A | 11/2009 |

* cited by examiner

*Primary Examiner* — Hau Phan
(74) *Attorney, Agent, or Firm* — Westerman, Hattori, Daniels & Adrian, LLP

(57) ABSTRACT

A structure for mounting a power supply device in a vehicle includes: a rear bulkhead that separates a cabin and a rear trunk; and a power supply device that is disposed in the rear trunk while opposing the rear bulkhead and that has upper, right, left and rear surfaces covered by a metal cover.

7 Claims, 13 Drawing Sheets

STRUCTURE FOR MOUNTING POWER SUPPLY DEVICE IN VEHICLE

CROSS REFERENCES TO RELATED APPLICATIONS

The present application claims priority under 35 U.S.C. §119 to Japanese Patent Application No. 2012-095051, filed Apr. 18, 2012, entitled "Structure for Mounting Power Supply Device in Vehicle." The contents of this application are incorporated herein by reference in their entirety.

TECHNICAL FIELD

The present disclosure relates to a structure for mounting a power supply device in a vehicle.

BACKGROUND

Currently, hybrid, electric or some other types of vehicles are known, which are equipped with a power supply device, for a drive operation, that integrates a power storage device such as a storage battery in a unit. For example, Japanese Unexamined Patent Application Publication No. 2009-274665 describes a structure which is equipped with a power supply device in the rear trunk of a vehicle body and which can suppress an external force from being exerted on the power supply device when the rear of the vehicle body receives an impact. Japanese Unexamined Patent Application Publication No. 11-139348 describes a technique for reinforcing a rear bulkhead in a vehicle body which separates a cabin and a rear trunk, without increasing the thickness of the bulkhead.

SUMMARY

In the above structure equipped with the power supply device, unfortunately, the battery of the power supply device in the trunk emits electromagnetic waves, which may cause electrical noise in equipment, such as a radio, provided in the front area of the vehicle body. Therefore, the entire power supply device is required to be electromagnetically shielded with a metal casing. However, this shielding restricts the size of the battery, since the storage space for the battery is limited. Furthermore, covering the battery with the metal casing results in the enlargement of the power supply device. This enlargement may decrease a crash stroke at the rear of the vehicle body in the case of a rear-end collision. On the other hand, in the above technique for reinforcing the rear bulkhead, this bulkhead is provided with a through hole with a load-through hatch. With this through-hole, disadvantageously, electromagnetic waves emitted from the battery directly reach the electrical equipment in the cabin, such as a radio, to cause electrical noise as described above.

It is desirable to provide a structure for mounting a power supply device in a vehicle, which prevents electromagnetic waves emitted from the power supply device from affecting the interior of the cabin, and enables the power supply device to be positioned in the front area of the rear trunk to secure a sufficient crush stroke at the rear of the vehicle body in the case of a rear-end collision.

According to a first aspect of the present disclosure, a structure for mounting a power supply device in a vehicle includes: a rear bulkhead (for example, a "rear bulkhead 16" in embodiments) that separates a cabin (for example, a "cabin C" in embodiments) and a rear trunk (for example, a "rear trunk T" in embodiments); and a power supply device (for example, a "power supply device 18" in embodiments) that is disposed in the rear trunk while opposing the rear bulkhead. Specifically, the power supply device has upper, right, left and rear surfaces covered by a metal cover (for example, a "metal cover 29" in embodiments).

According to a second aspect of the present disclosure, the rear bulkhead preferably includes: a framework reinforcement unit (for example, a "framework reinforcement plate 17" in embodiments) that is fixed to a rectangular framework portion (for example, a "rectangular framework portion K" in embodiments) and that reinforces the rectangular framework portion cornerwise; and an electromagnetic wave shield unit (for example, an "electromagnetic wave shield plate 19" in embodiments) that is positioned to cover a front surface of the power supply device. Here, the thickness of the framework reinforcement unit is larger than that of the electromagnetic wave shield unit. In more detail, the above rectangular framework portion is formed by a plurality of cross members (a "lower rear bulkhead cross-member 3" and an "upper rear bulkhead cross-member 12" in embodiments) and right and left damper housings (for example, "damper housings 6 and 6" in embodiments). The respective cross members are arranged at upper and lower parts of the rear bulkhead, and extend in a width direction of a vehicle body.

According to a third aspect of the present disclosure, the framework reinforcement unit of the rear bulkhead preferably includes: a plurality of beads (for example, an "upper outer bead US", an "upper inner bead UU", a "lower inner bead SU", a "lower outer bead SS", and a "lower outermost bead SSG" in embodiments). These beads extend radially toward either of the upper and lower cross members from a location near a damper base (for example, a "damper base 7" in embodiments) of each damper housing.

According to a fourth aspect of the present disclosure, the rear bulkhead may be fastened to the rectangular framework portion with a removable fastening tool (for example, "bolts 23" in embodiments).

According to a fifth aspect of the present disclosure, the electromagnetic wave shield unit of the rear bulkhead may be provided with an openable and closable opening (for example, an "opening 47" in embodiments) that enables a power switch (for example, a "power switch 46" in embodiments) of the power supply device to be operated therethrough.

According to a sixth aspect of the present disclosure, the framework reinforcement unit of the rear bulkhead may be provided with a lateral side portion (for example, "side plates 17S and 17S" in embodiments), and a lower central portion (for example, a "lower central plate 17T" in embodiments). A thickness of the lateral side portion is larger than that of the lower central portion. The lateral side portion is provided with a plurality of beads (for example, an "upper outer bead US", an "upper inner bead UU", a "lower inner bead SU", a "lower outer bead SS", and a "lower outermost bead SSG" in embodiments), and one or more of the beads (for example, the lower inner bead SU) continue to the lower central portion.

According to a seventh aspect of the present disclosure, one of the framework reinforcement unit and the electromagnetic wave shield unit of the rear bulkhead may be provided with a depression (for example, a depression 55 in embodiments). Further, the framework reinforcement unit and the electromagnetic wave shield unit may be fixed to each other while a bottom wall (for example, a "bottom wall 56" in embodiments) of the depression in the one of the framework reinforcement unit and the electromagnetic wave shield unit is in contact with the other thereof. In the above explanation of the exemplary aspects, specific elements with their reference numerals are indicated. These specific elements are presented as mere examples in order to facilitate understanding, and thus, should not be interpreted as any limitation to the accompanying claims.

With the first aspect, the power supply device can be disposed in the front area of the vehicle body, because the front surface of the power supply device is not covered by the metal cover. Consequently, a long crush stroke can be reserved at the rear of the vehicle body in the case of a rear-end collision. In addition, since the rear bulkhead made of a metal material blocks electromagnetic waves emitted from the front surface of the power supply device which is not covered by the metal cover, the electromagnetic waves can be prevented from affecting the cabin.

With the second aspect, the rear bulkhead can be reduced in weight without involving the increase in the thickness thereof, and the torsional deformation of the rectangular framework portion can be suppressed by distributing a damper input load to the framework reinforcement unit.

With the third aspect, even when a damper input load is applied to the damper base, the damper input load can be effectively distributed to the framework reinforcement unit from the damper base.

With the fourth aspect, the rear bulkhead can be detached from the rectangular framework portion by removing the detachable fastening tool. Therefore, the power supply device can be easily mounted in the rear trunk or maintained.

With the fifth aspect, the power supply device can provide easier maintenance without deteriorating the reinforcement effect which the rear bulkhead provides for the rectangular framework portion.

With the sixth aspect, one or more of the beads in the lateral side portion continue to the lower central portion. Consequently, it is possible to further reduce the weight of the rear bulkhead, and to effectively suppress the torsional deformation of the rectangular framework portion.

With the seventh aspect, a contact area between the framework reinforcement panel and the electromagnetic wave shield panel is decreased. It is thus possible to suppress noise caused by vibrations between the panels.

BRIEF DESCRIPTION OF THE DRAWINGS

The advantages of the disclosure will become apparent in the following description taken in conjunction with the following drawings.

DETAILED DESCRIPTION

Figure 1:
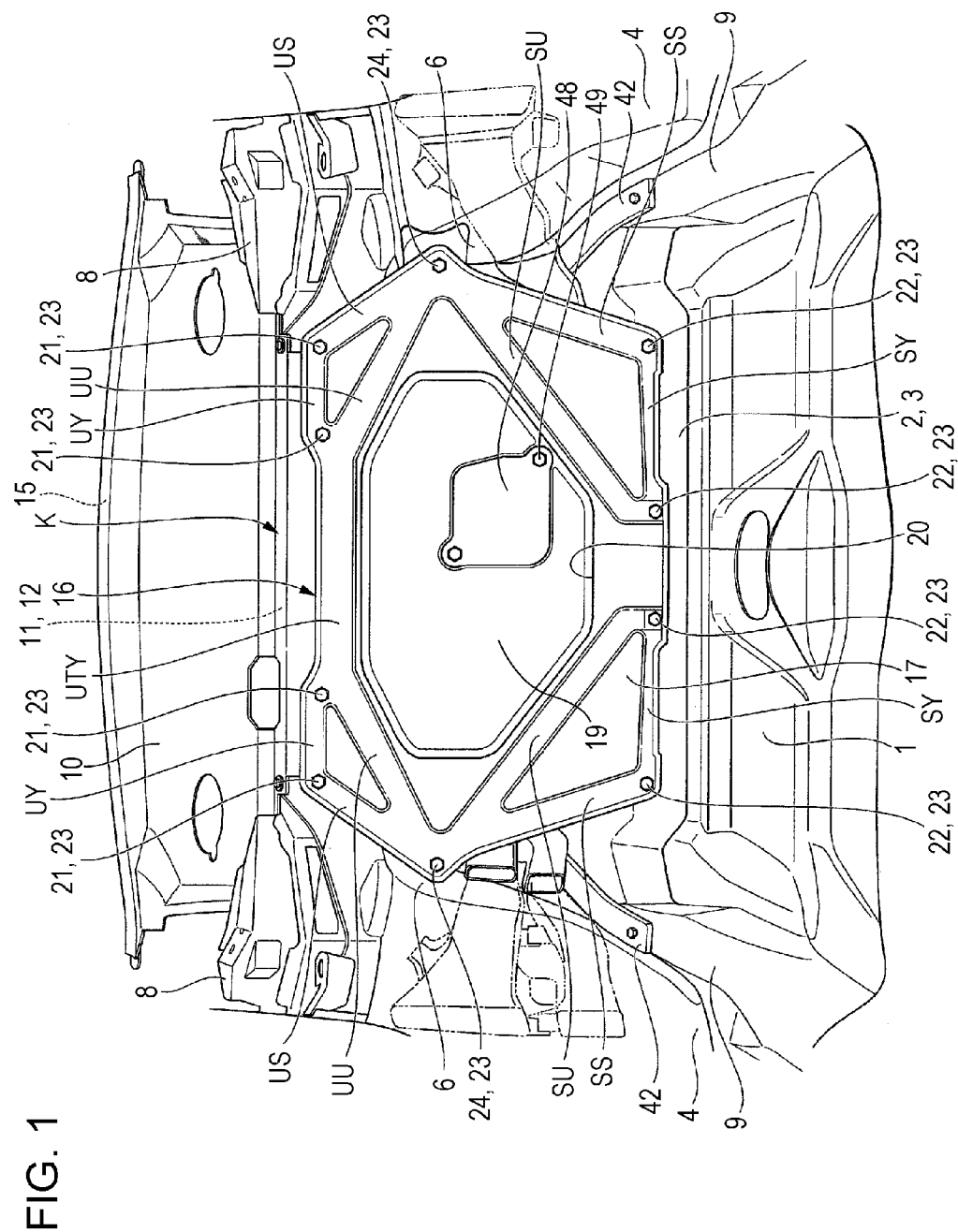
FIG. 1 is a perspective view illustrating a rear bulkhead according to a first embodiment of the present disclosure as seen from the upper front thereof.
Figure 2:
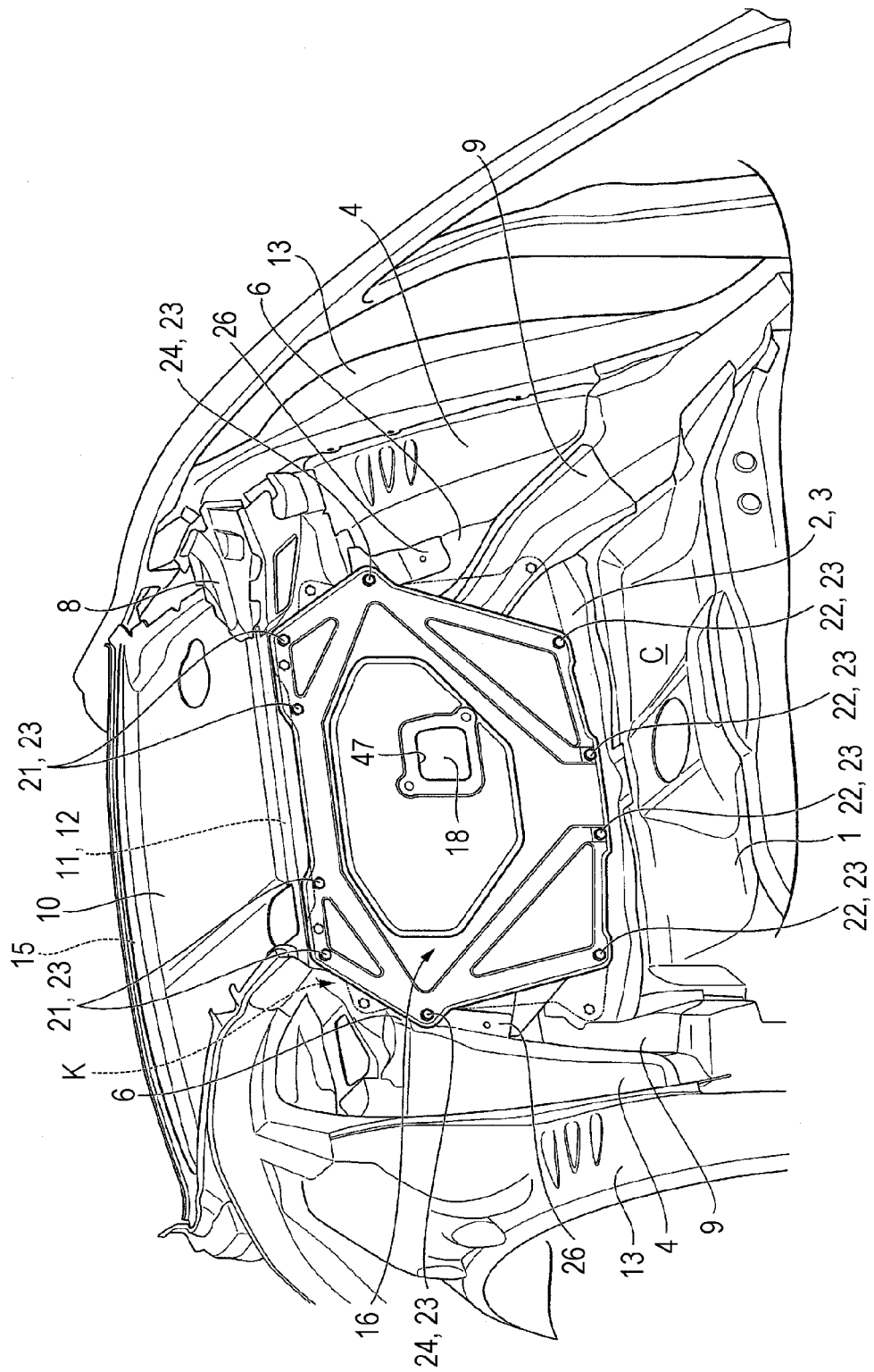
FIG. 2 is a perspective view illustrating the rear bulkhead as seen from the upper and right front thereof.
Figure 3:
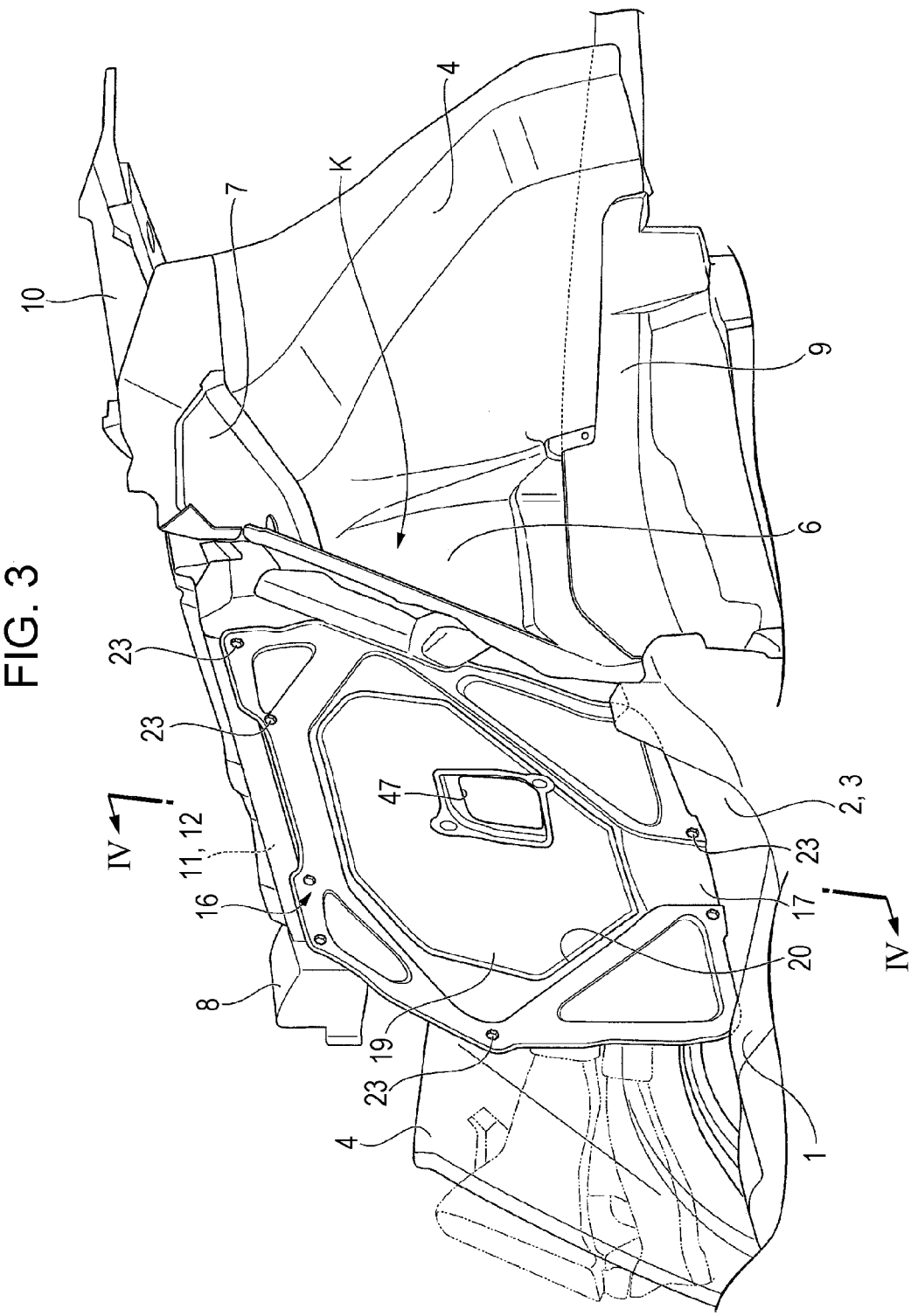
FIG. 3 is a perspective view illustrating the rear bulkhead as seen from the left front thereof.
Figure 4:
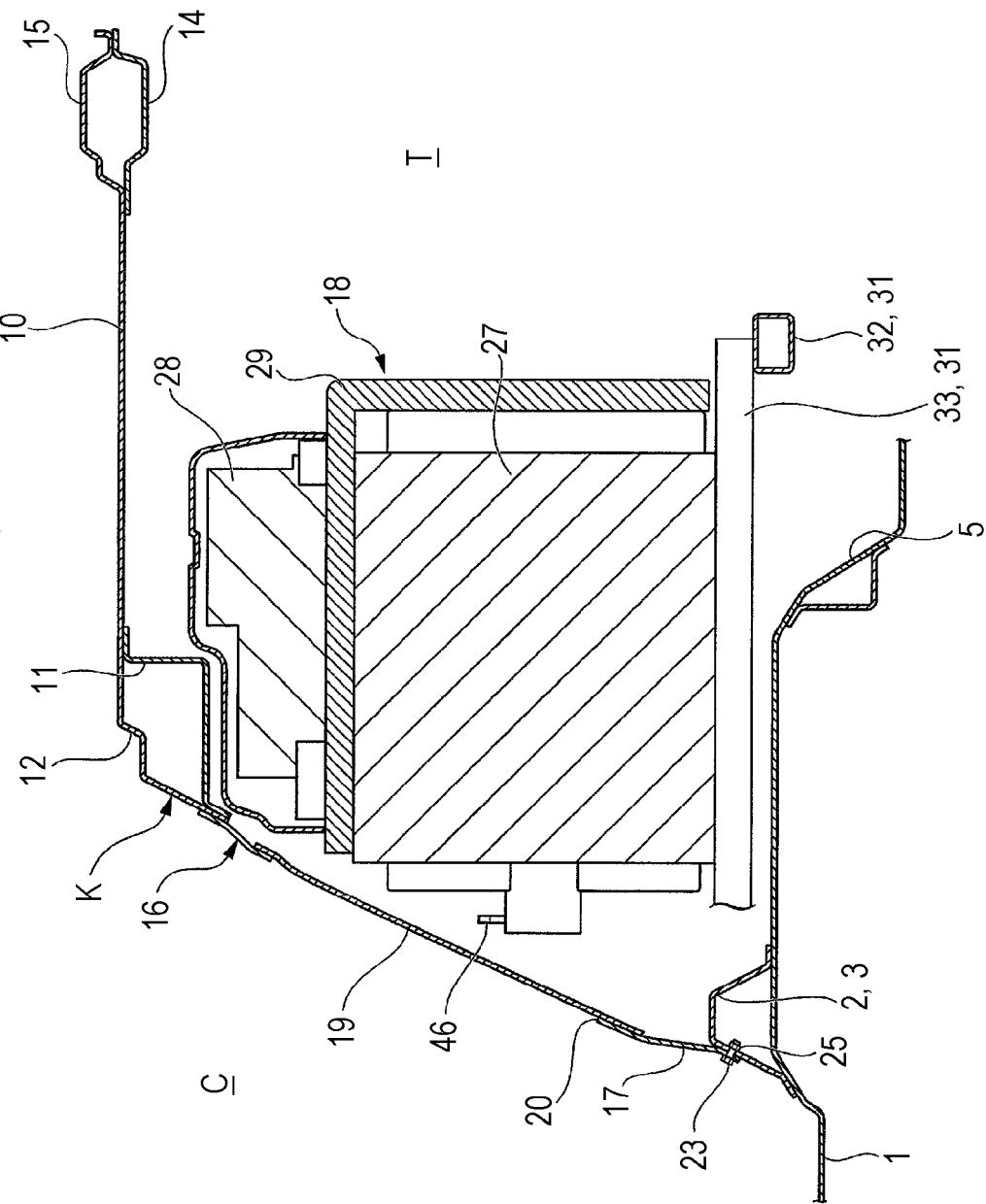
FIG. 4 is a view illustrating a cross section of the rear bulkhead taken along a line IV-IV of FIG. 3.

Hereinafter, a description will be given of a structure for mounting a power supply device in a vehicle according to a first embodiment of the present disclosure. FIG. 1 is a perspective view illustrating a rear bulkhead as seen from the upper front thereof. FIG. 2 is a perspective view illustrating the rear bulkhead as seen from the upper and right front thereof. FIG. 3 is a perspective view illustrating the rear bulkhead as seen from the left front thereof. FIG. 4 is a view illustrating a cross section of the rear bulkhead taken along a line IV-IV of FIG. 3.

Referring to FIGS. 1 to 4, a rear floor 1 is shaped such that the rear floor is raised along the longitudinal direction to have a raised rear portion. The rear upper surface of the rear floor 1 is coupled to a rear floor cross-member 2 having a cross section of a U-shape and extending in a width direction of a vehicle body. As a result, a lower rear bulkhead cross-member 3 is formed, which has a closed cross section structure and extends along the width direction (see FIG. 4). The rear end of the rear floor 1 is coupled to a spare tire pan 5 depressed downward in the middle thereof, as illustrated in FIG. 4. A pair of rear wheel housings 4 and 4 bulge toward the interior of the vehicle body, and are coupled to the right and left sides of the vehicle body. The wheel housings 4 and 4 extend in a longitudinal direction of the vehicle body and are provided over a coupling part of the spare tire pan 5 and the rear floor 1. The inner part of each rear wheel housing 4 constitutes a damper housing 6 accommodating a rear cushion (not illustrated). The upper part of each damper housing 6 is attached with a damper base 7 (see FIG. 3) for fixing the upper part of a rear damper, and each damper base 7 is attached with a reinforcement member 8 projecting toward the interior of the vehicle body. A pair of right and left rear frames 9 and 9 is provided so as to extend from the rear floor 1 to the respective sides of the spare tire pans 5 in the longitudinal direction. The respective rear frames 9 and 9 are coupled to the lower parts of the rear wheel housings 4.

The reference numeral 10 refers to a rear parcel shelf. The rear parcel shelf 10 is a plate-shaped member that is disposed so as to extend laterally toward the rear, and the front end of the rear parcel shelf 10 is supported by the pair of damper housings 6 and 6 through the reinforcement members 8 and 8. The back surface of the rear parcel shelf 10 at the front-end is coupled to a member 11 having a cross section of an L-shape, so that an upper rear bulkhead cross-member 12 is formed which has a closed cross section structure and extends in the width direction. Specifically, the upper rear bulkhead cross-member 12 is connected to the respective upper parts of the pair of damper housings 6 and 6 through the reinforcement members 8 and 8, and the lower parts of the pair of damper housings 6 and 6 are connected to respective sides of the rear floor cross-members 2. A rear inner panel 13 (see FIG. 2) is coupled to the outer side of each rear wheel housing 4, so that each damper housing 6 forms a space enclosed internally and externally. The rear-end lower surface of the rear parcel shelf 10 is connected to a reinforcement 14, thereby forming a closed cross section structural portion 15.

A rectangular framework portion K having a closed cross section structure is formed by: the upper rear bulkhead cross-member 12 with a closed cross section structure which is formed at the front end of the rear parcel shelf 10 so as to extend in the width direction; the lower rear bulkhead cross-member 3 with a closed cross section structure which is formed at the rear of the rear floor 1 so as to extend in the width direction; and the damper housings 6 and 6 with a closed cross section structure which are formed vertically on the right and left sides of the vehicle body so as to couple both ends of the upper rear bulkhead cross-member 12 and the lower rear bulkhead cross-member 3. Moreover, the rear bulkhead 16, which separates a cabin C and a rear trunk T, is attached to the rectangular framework portion K with bolts 23, thereby covering the rectangular framework portion K, as illustrated in FIGS. 3 and 4. Here, any other attachable/detachable fastening members may be used in place of the bolts 23.

The rear bulkhead 16 includes a thick framework reinforcement plate 17 (thickness of 1 mm to 2 mm) that reinforces the rectangular framework portion K cornerwise with beads (described later), and an electromagnetic wave shield plate 19 (thickness of approximately 0.5 mm) that is positioned so as to cover the front surface of a power supply device 18 (described later) and that has a smaller thickness than the framework reinforcement plate 17. The framework reinforcement plate 17 is provided with an aperture portion 20 at the center thereof, which is covered by the electromagnetic wave shield plate 19. The framework reinforcement plate 17 includes: upper part fastening portions 21, respective two of which are arranged on the right and left sides of the upper end part; and lower part fastening portions 22 and 22, respective two of which are arranged on the right and left sides of the lower end part. The upper part fastening portions 21 and the lower part fastening portions 22 are fixed to the upper rear bulkhead cross-member 12 and the lower rear bulkhead cross-member 3, respectively, with the bolts 23. In addition, the side parts of the framework reinforcement plate 17 is each formed in a triangular shape having an apex protruding laterally, and each of the apexes is provided with a side part fastening portion 24. The side part fastening portions 24 and 24 are fixed to the damper housings 6 and 6 through bolt fastening brackets 26 and 26 with the bolts 23 and 23, respectively (see FIG. 2). The aperture portion 20 is formed in a shape composed of an upper edge extending laterally, a lower edge extending laterally and being shorter than the upper edge, both side edges being slightly shorter than the lower edge, and four oblique edges connecting between the lateral edges and the side edges. In FIG. 2, the aperture portion 20 is formed in an irregular octagonal shape.

Figure 5:
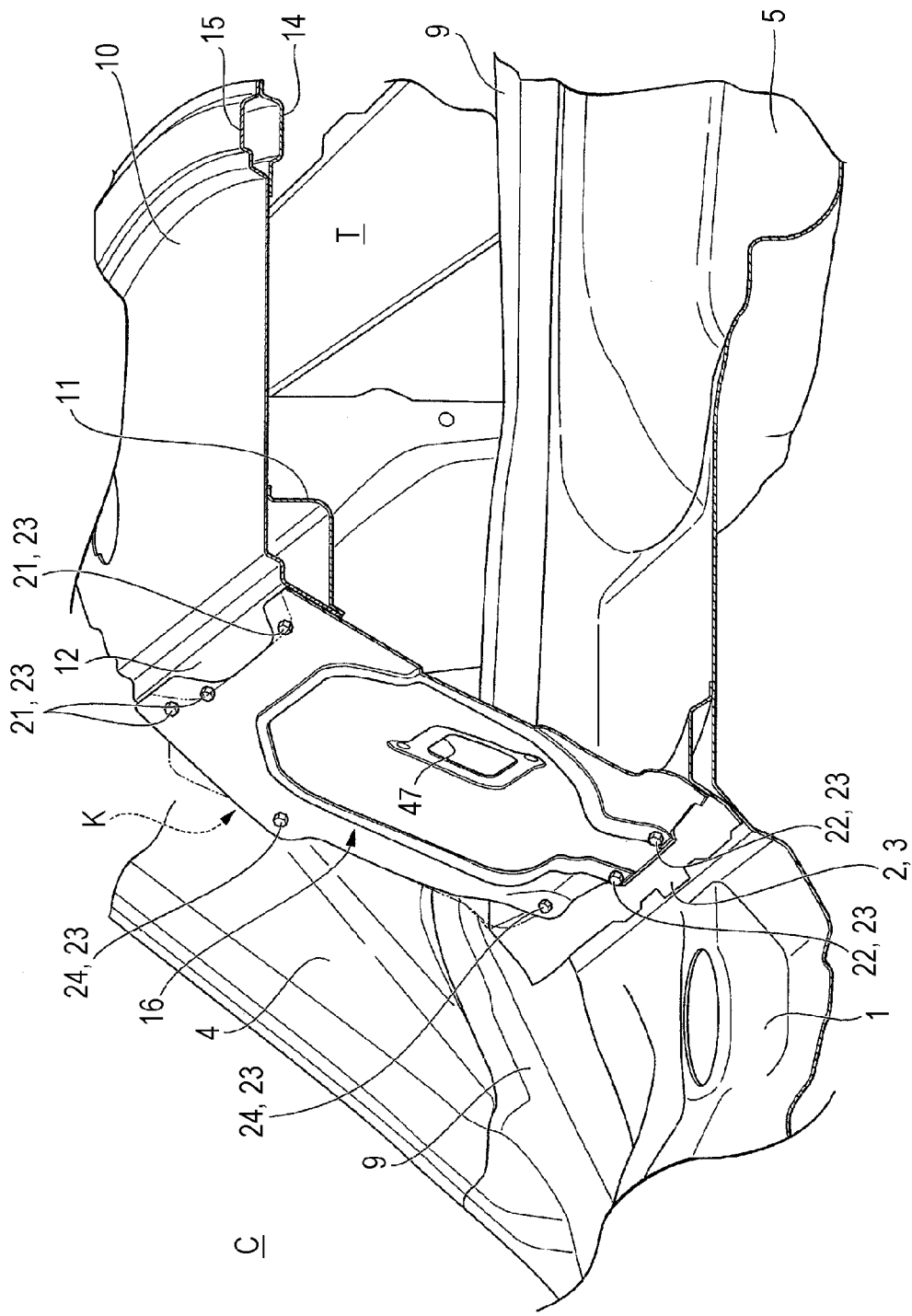
FIG. 5 is a perspective view illustrating a cross section of the rear bulkhead and a surrounding part thereof.
Figure 6:
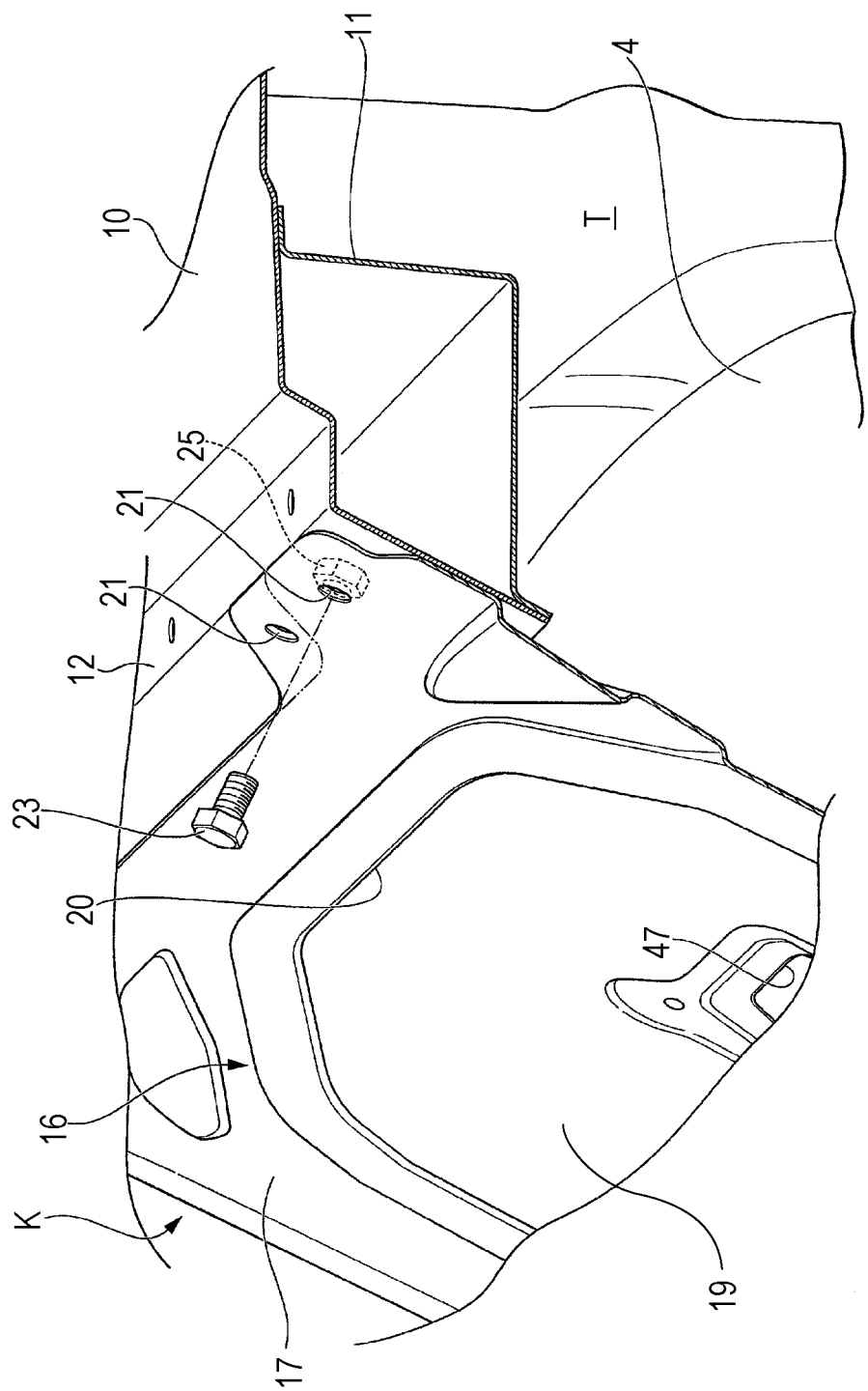
FIG. 6 is an enlarged view illustrating a part of the rear bulkhead in FIG. 5.

As illustrated in FIGS. 5 and 6, the bolts 23 that have been inserted into the upper part of the rear bulkhead 16 are fastened to weld nuts 25 on the back surface of the front part of the rear parcel shelf 10 which extends obliquely downward. As a result, the upper part fastening portions 21 are fixed to the upper rear bulkhead cross-member 12. Likewise, the bolts 23 that have been inserted into the lower side of the rear bulkhead 16 are fastened to weld nuts 25 (see FIG. 4) on the back surface of the front wall of the rear floor cross-member 2. As a result, the lower part fastening portions 22 are fixed to the lower rear bulkhead cross-member 3.

Figure 7:
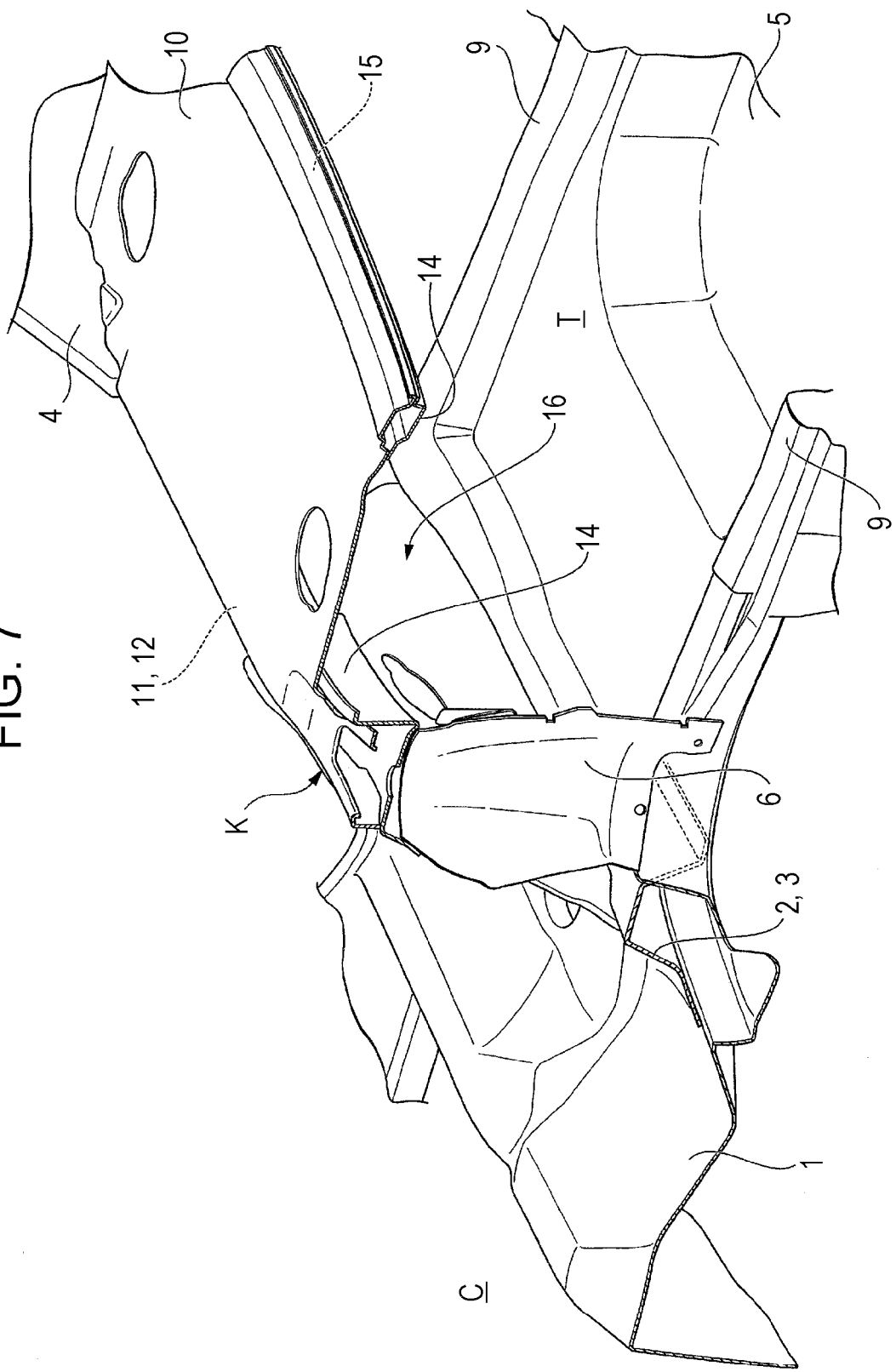
FIG. 7 is a perspective view illustrating the cross section of the rear bulkhead as seen from the upper and left rear thereof.
Figure 8:
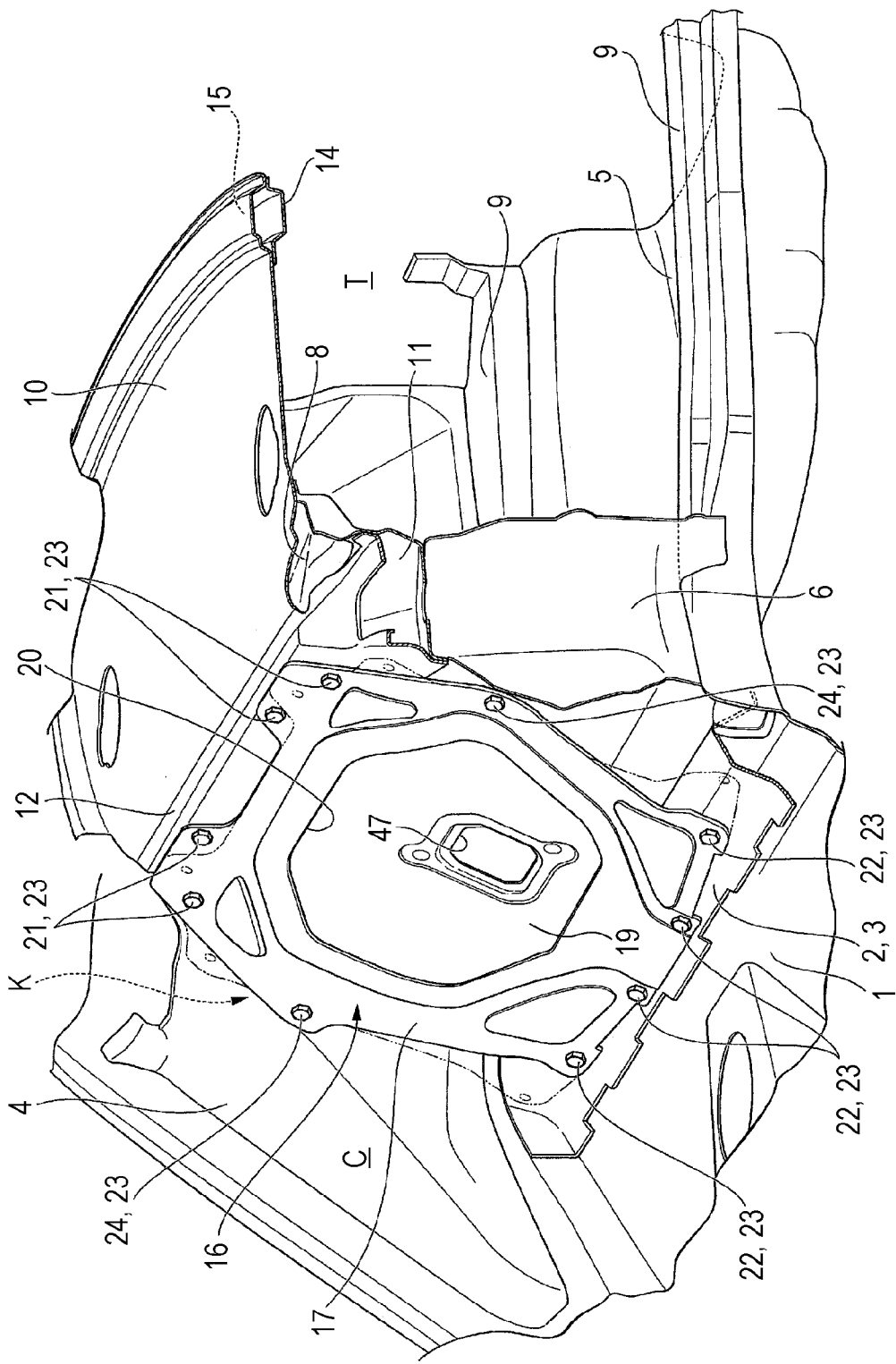
FIG. 8 is a perspective view illustrating the cross section of the rear bulkhead as seen from the upper and left front thereof.

As illustrated in FIG. 7, the reinforcement 14, which is a lower wall of the upper rear bulkhead cross-member 12, is coupled to the upper parts of the damper housings 6 and 6 whose respective lower ends are coupled to the rear frames 9 and 9. Further, as illustrated in FIG. 8, the reinforcement member 8 fixed to the upper parts of the damper housings 6 and 6 is coupled to the side parts of the rear parcel shelf 10.

As illustrated in FIG. 1, the framework reinforcement plate 17 includes a plurality of beads formed cornerwise. To be specific, the respective beads extend radially from both side part fastening portions 24 and 24 positioned near the damper bases 7 and 7 of the damper housings 6 and 6, toward either of the upper rear bulkhead cross-member 12 and the lower rear bulkhead cross-member 3. In addition, each bead is recessed toward the rear. Hereinafter, because the framework reinforcement plate 17 has a symmetrical shape, the same reference numerals are assigned to respective left and right corresponding portions of the framework reinforcement plate 17, and a description will be given of only portions on the right side (the left side of the vehicle body) as examples.

Specifically, as illustrated in FIG. 1, an upper outer bead US and an upper inner bead UU are formed from the side part fastening portion 24 to the upper rear bulkhead cross-member 12. In more detail, the upper outer bead US extends along the outer edge of the framework reinforcement plate 17, and the upper inner bead UU extends along the inner edge of the aperture portion 20. Furthermore, a lower outer bead SS and a lower inner bead SU are formed from the side part fastening portion 24 to the lower rear bulkhead cross-member 3. In more detail, the lower outer bead SS extends along the outer edge of the framework reinforcement plate 17, and a lower inner bead SU extends along the inner edge of the aperture portion 20.

The upper edge of the upper inner bead UU continues to an upper middle lateral bead UTY formed in the middle of the framework reinforcement plate 17 along the width direction of the vehicle body, and the upper outer bead US extends to the upper edge of the framework reinforcement plate 17. The inner upper part fastening portion 21 is provided at a connecting point of the upper middle lateral bead UTY and the upper inner bead UU, and the outer upper part fastening portion 21 is provided at the upper end of the upper outer bead US. An upper lateral bead UY is formed so as to extend from the outer upper part fastening portion 21 toward the upper middle of the framework reinforcement plate 17 along the upper edge thereof. The lower inner bead SU extends downward to the lower edge of the framework reinforcement plate 17 along the aperture portion 20. The lower outer bead SS extends downward to the lower edge of the framework reinforcement plate 17 along the outer edge of the framework reinforcement plate 17. The inner lower part fastening portions 22 is provided at the lower end of the lower inner bead SU, and the outer lower part fastening portions 22 is provided around the lower edge of the lower outer bead SS. A lower lateral bead SY is formed between both lower ends of the lower outer bead SS and the lower inner bead SU, so as to extend along the lower edge of the framework reinforcement plate 17.

The electromagnetic wave shield plate 19 is connected to an area surrounding the aperture portion 20 in the framework reinforcement plate 17 with spot welding, as illustrated in FIG. 1. Alternatively, the electromagnetic wave shield plate 19 may be connected to the framework reinforcement plate 17 with bolts, rivets, or MIG welding, in place of spot welding. By entirely covering a front surface of the power supply device 18 (described later) with the electromagnetic wave shield plate 19, an electromagnetic wave emitted forwardly from the power supply device 18 is blocked.

Figure 9:
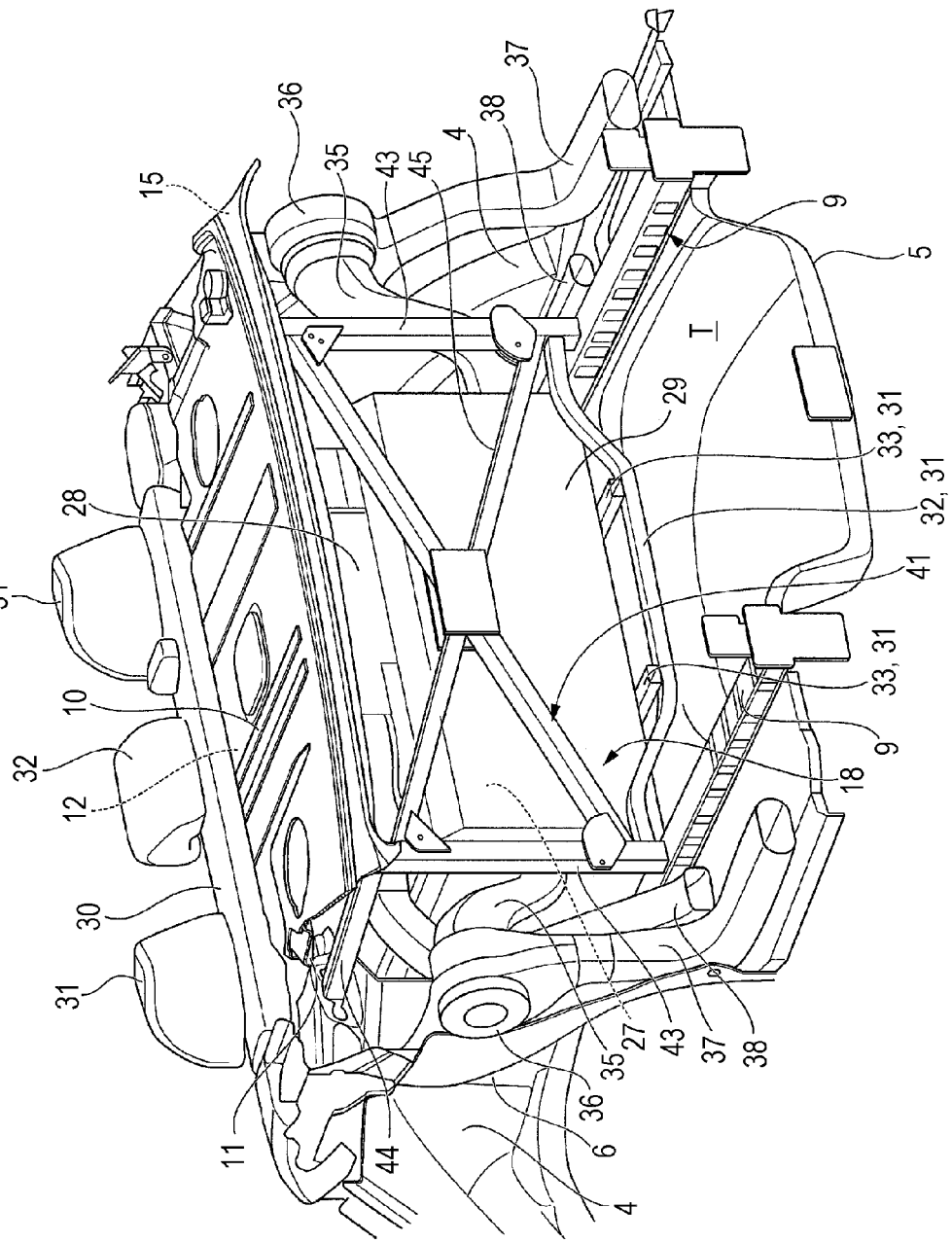
FIG. 9 is a perspective view of a state where a power supply device is mounted as seen from the rear.
Figure 10:
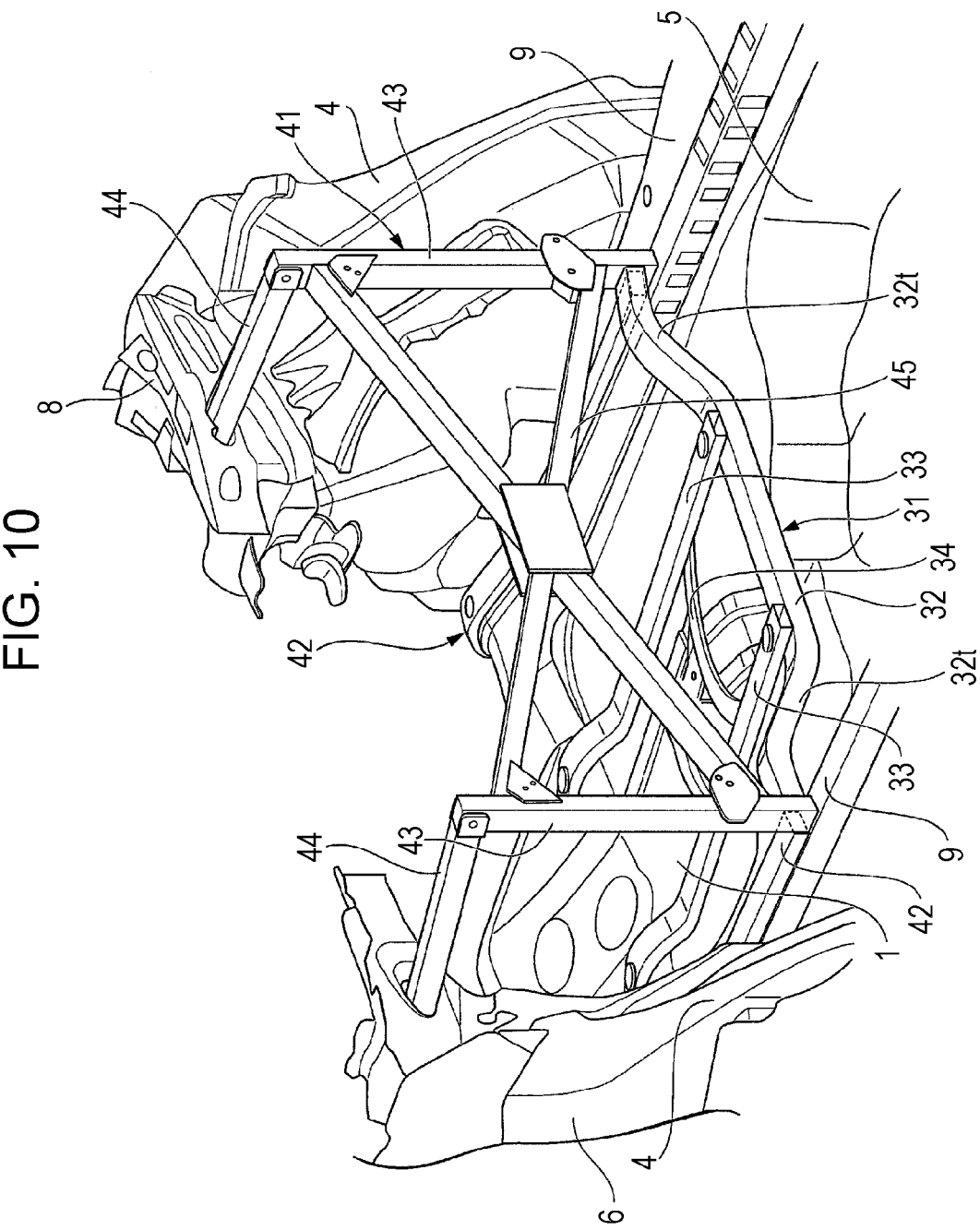
FIG. 10 is a perspective view of a state where the power supply device of FIG. 9 is removed.

FIG. 9 is a perspective view of a state where the power supply device is mounted as seen from the rear, and FIG. 10 is a perspective view of a state where the power supply device of FIG. 9 is removed. It should be noted that in FIG. 9, the left part of the rear parcel shelf 10 is partially cut out, and in FIG. 10, the rear parcel shelf 10 and rear seats are not illustrated. As illustrated in FIGS. 4, 9 and 10, the rear trunk T and the cabin C are separated by the rear bulkhead 16, and the power supply device 18 is disposed in the rear trunk T so as to be positioned opposite and adjacent to the rear bulkhead 16. The power supply device 18 includes a lithium-ion type battery 27 at the lower part, as a main component, and a high-voltage device 28 at the upper part. The power supply device 18 supplies electricity for a drive operation to an electric motor (not illustrated), and in turn stores electricity generated by the rotating electric motor. The upper, right, left, and rear surfaces of the power supply device 18 is covered by a metal cover 29, but the front surface thereof is not covered by the metal cover 29. As a result, the metal cover 29 blocks electromagnetic waves emitted from the upper, right, left, and rear surfaces of the power supply device 18. Meanwhile, an electromagnetic wave emitted from the front surface of the power supply device 18 is blocked by the electromagnetic wave shield plate 19 of the rear bulkhead 16. A rear seat 30 is disposed in front of the rear bulkhead 16, and headrests 31, 31 and 32 are provided at the upper right, upper left and upper middle of the rear seat 30, respectively. The rear parcel shelf 10 is disposed laterally at the rear of the headrests 31, 31 and 32.

The power supply device 18 is supported by a mounting frame 31. The mounting frame 31 includes a transverse frame 32 and a pair of longitudinal frames 33 and 33 that all have a closed cross section structure. Specifically, the transverse frame 32 has both ends in the width direction which are supported by a pair of rear frames 9 and 9, and is curved along the depression of the spare tire pan 5, such that the middle portion of the transverse frame 32 is positioned lower than the ends. The longitudinal frames 33 and 33 are connected to the middle portion of the transverse frame 32 and extend forwardly from the middle portion of the transverse frame 32 along the longitudinal direction. The longitudinal frames 33 and 33 are separated away from each other in the width direction by a predetermined distance. In addition, a forwardly protruded arc-shaped reinforcement frame 34 is attached to the longitudinal framed 33 and 33 at the rear portion thereof.

In the power supply device 18, the bottom surface is fixed to the longitudinal frames 33 and 33 of the mounting frame 31, the side surfaces are fixed to lower side members 42 and 42 (described later), and the lower right and left corners of the rear surface thereof are positioned in front of the front walls of raised portions 32t and 32t of the transverse frame 32. The right and left surfaces of the metal cover 29 are connected to respective inner cooling ducts 35 in order to cool down the battery 27, and each inner cooling duct 35 extends upward. The end of each inner cooling duct 35 is attached to a cooling fan 36. Each cooling fan 36 is connected to an external duct 37 that extends downward and backward and is opened on the floor. Furthermore, device ducts 38 are attached to the right and left surfaces of the metal cover 29 in order to cool down the device 28. It should be noted that although the inner cooling ducts 35 and 35, the cooling fans 36 and 36, and the external ducts 37 and 37 are omitted in FIG. 1, the respective external ducts 37 and 37 may be routed in front of the rear wheel housings 4 and 4 as indicated by chain lines in FIG. 1.

As illustrated in FIG. 10, a protection guard 41 is provided on the inner sides of the external ducts 37 and 37, so as to cover the rear of the power supply device 18. The protection guard 41 includes lower side members 42 and 42, vertical members 43 and 43, a cross member 45, and upper side members 44 and 44. Specifically, the respective lower side members 42 and 42 are installed on the rear frame 9, and the respective rear ends thereof are positioned near both ends of the transverse frame 32. The respective vertical members 43 and 43 are provided so as to abut against both rear ends of the lower side members 42 and 42 and to be erected on the rear frames 9 and 9. The cross member 45 is attached to both upper and lower ends of the vertical members 43 and 43 cornerwise. The upper side members 44 and 44 extend forwardly from the upper ends of the vertical members 43 and 43, and the front ends of the upper side members 44 and 44 are fixed to the reinforcement members 8 and 8 located above the damper housings 6 and 6, respectively.

Figure 11:
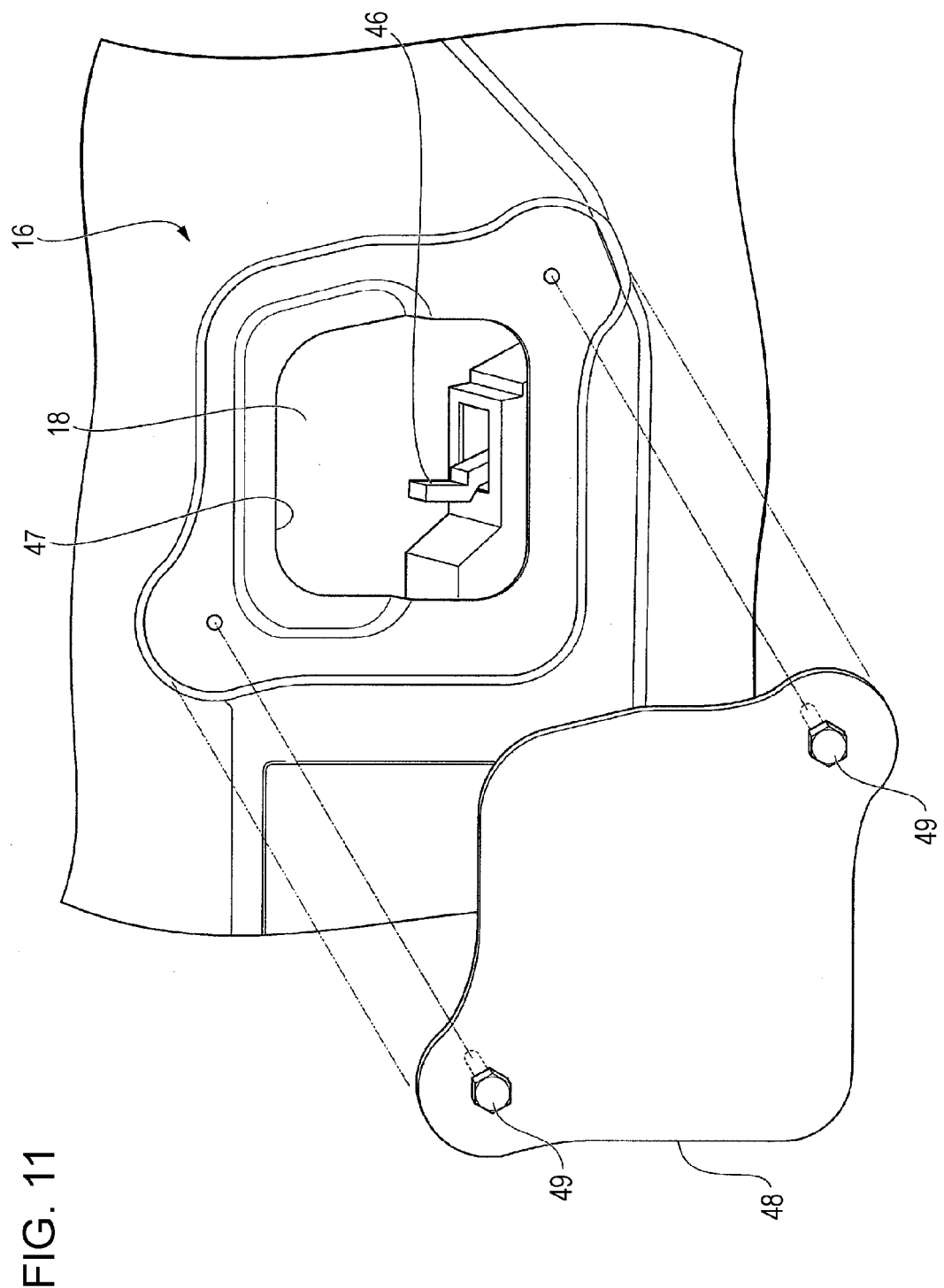
FIG. 11 is a view illustrating an opening for operating the power supply device.

As illustrated in FIG. 11, a power switch 46 is provided at the front of the power supply device 18, and an opening 47 for operating the power switch 46 is formed in the electromagnetic wave shield plate 19 of the rear bulkhead 16 at the position corresponding to that of the power switch 46. A lid 48 is attached to an area surrounding the opening 47 with bolts 49 in an openable and closable manner. It should be noted that the drawings aside from FIGS. 1 and 11 illustrate the opening 47 in the state where the lid 48 is removed.

In the first embodiment, the front surface of the power supply device 18 is covered by the electromagnetic wave shield plate 19 of the rear bulkhead 16. Since the front surface of the power supply device 18 does not need to be covered by the metal cover 29, the power supply device 18 can be disposed in the front area of the vehicle body, namely, closer to and adjacent to the rear bulkhead 16. Consequently, in relation to the arrangement in which the power supply device 18 can be shifted to the front area, a longer crush stroke can be reserved at the rear of the vehicle body in the case of a rear-end collision. In addition, because the rear bulkhead 16 made of a metal material blocks electromagnetic waves emitted from the front surface of the power supply device 18 which is not covered by the metal cover 29, the electromagnetic waves can be prevented from affecting electrical equipment, such as a radio, in the cabin. In particular, the electromagnetic wave shield plate 19 can reliably block electromagnetic waves emitted forwardly from the power supply device 18.

As described above, the rear bulkhead 16 is fixed to the rectangular framework portion K which is constituted by: the upper rear bulkhead cross-member 12 disposed at the upper part of the rear bulkhead 16 and extending in the width direction; the lower rear bulkhead cross-member 3 disposed at the lower part of the rear bulkhead 16 and extending in the width direction; and the pair of right and left damper housings 6 and 6. Moreover, the rear bulkhead 16 includes: the framework reinforcement plate 17 that reinforces the rectangular framework portion K cornerwise by using the plurality of beads, namely, the upper outer beads US and US, the upper inner beads UU and UU, the lower inner beads SU and SU, and the lower outer beads SS and SS; and the electromagnetic wave shield plate 19 disposed so as to cover the front surface of the power supply device 18. Here, the framework reinforcement plate 17 has a larger thickness than the electromagnetic wave shield plate 19. Consequently, it is possible to reduce the weight of the rear bulkhead 16 without involving the increase in the thickness thereof, and to suppress the torsional deformation of the rectangular framework portion K by distributing damper input load in the framework reinforcement plate 17.

When the damper input load is applied from the damper base 7, the load can be effectively distributed in the rear bulkhead 16. Specifically, part of the load is distributed to the upper rear bulkhead cross-member 12 by the upper outer beads US and US and the upper inner beads UU and UU in the framework reinforcement plate 17 and another part thereof is distributed to the lower rear bulkhead cross-member 3 by the lower outer beads SS and SS and the lower inner beads SU and SU in the framework reinforcement plate 17. The rear bulkhead 16 can be detached from the rectangular framework portion K by removing the bolts 23. Therefore, the power supply device 18 can be easily mounted in the rear trunk T or maintained. The lid 48 of the electromagnetic wave shield plate 19 in the rear bulkhead 16 can be opened by removing the bolts 49, and the power switch 46 is operated through the opening. Consequently, the power supply device 18 can be maintained without subjecting any processing to the framework reinforcement plate 17. In other words, the maintenance can be performed safely without deteriorating the reinforcement effect which the rear bulkhead 16 provides for the rectangular framework portion K.

The shape of the rear bulkhead 16 is not limited by this embodiment. Alternatively, as indicated by a chain line of FIG. 2, for example, an auxiliary fastening portion may be provided between each outer upper part fastening portion 21 and a corresponding side part fastening portion 24, and a projected extension may be provided on the outer side of each lower outer bead SS to form a lower outer fastening portion thereon. Furthermore, the inner upper part fastening portions 21 may be removed. With this structure, the rear bulkhead 16 can be fixed to the rectangular framework portion K more firmly, because the entire circumferential region of the rear bulkhead 16 is attached to the rectangular framework portion K with the bolts 23. This attachment structure is employed in a second embodiment that will be described hereinafter.

Figure 12:
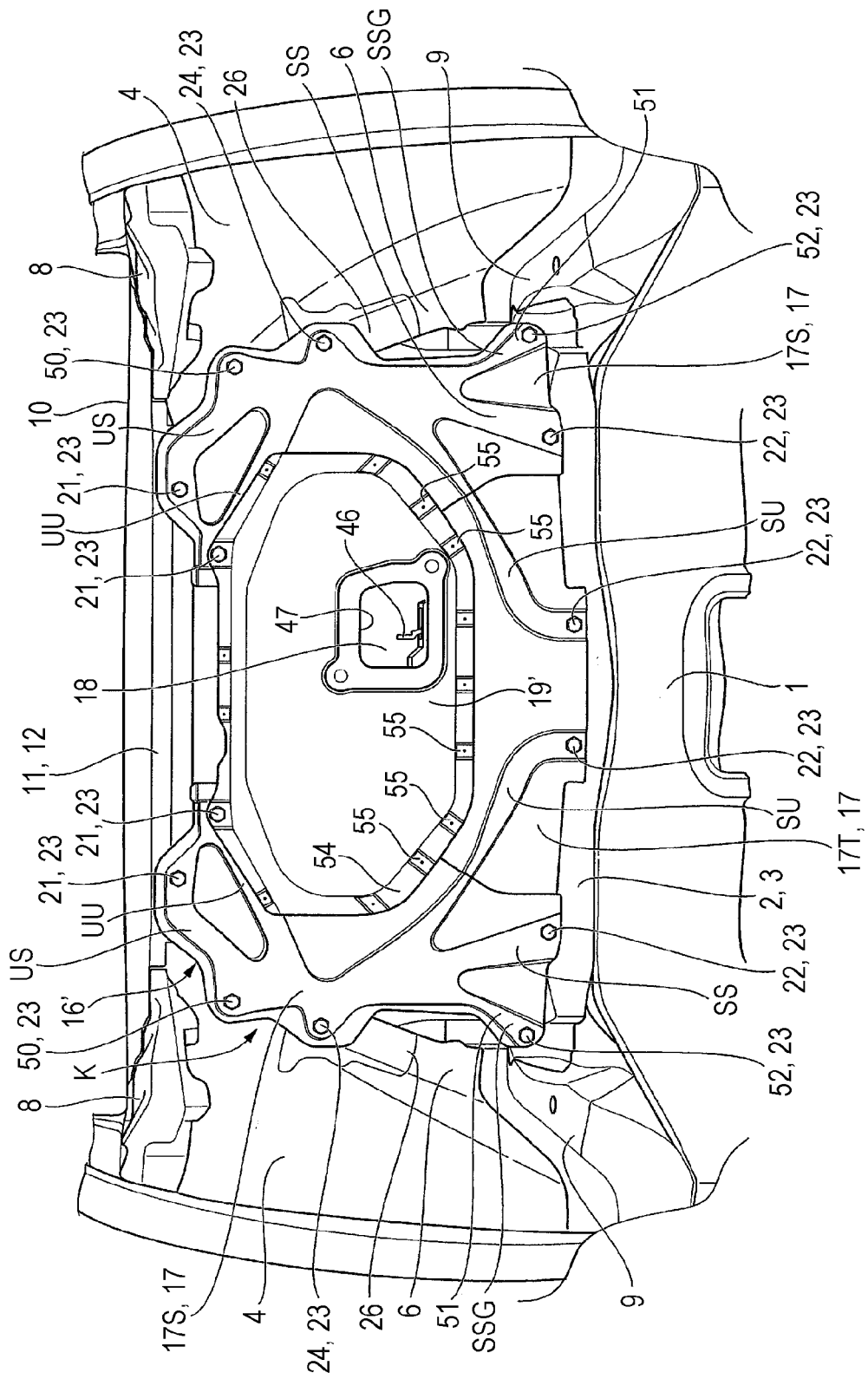
FIG. 12 is an elevation view illustrating a rear bulkhead according to a second embodiment of the present disclosure.
Figure 13:
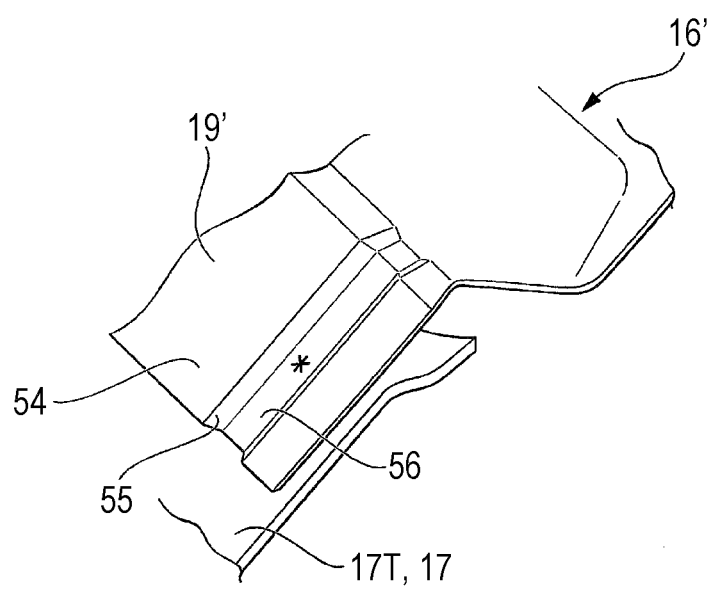
FIG. 13 is a perspective view illustrating a part of the rear bulkhead of FIG. 12.

Next, a second embodiment of the present disclosure will be described with reference to FIGS. 12 and 13. As illustrated in FIGS. 12 and 13, the second embodiment is identical in a basic structure to the first embodiment, for example, in that a rear bulkhead 16' is detachably attached to the rectangular framework portion K with bolts 23, and an electromagnetic wave shield plate 19' is provided with the opening 47 for operating the power switch 46 that can be opened or closed with the lid 48 (not illustrated). It should be noted that in FIGS. 12 and 13, the same reference numerals are assigned to the same components as those in the first embodiment. In this embodiment, the framework reinforcement plate 17 of the rear bulkhead 16' includes three independent members, namely, a pair of right and left side plates 17S and 17S and a lower central plate 17T. Each side plate 17S is made of a steel sheet (thickness of 2 mm). This steel sheet is thicker than a steel sheet (thickness of 1 mm) of the lower central plate 17T, and is also thicker than the central region (thickness of 0.5 mm) of the electromagnetic wave shield plate 19'. The electromagnetic wave shield plate 19' has a smaller vertical length than the electromagnetic wave shield plate 19 of the first embodiment, and this shape is similar to an elliptical shape.

A pair of side plates 17S and 17S are arranged so as to surround the side edges of the electromagnetic wave shield plate 19'. Further, the side plates 17S and 17S slightly protrude upward from the upper edge of the electromagnetic wave shield plate 19', and also protrude downward from the lower edge thereof. The lower central plate 17T is connected to the parts of the side plates 17S and 17S which protrude from the lower edge of the electromagnetic wave shield plate 19', in such a way to integrate the lower central plate 17T and the side plates 17S and 17S by bridging the side plates. The contour of each side plate 17S is formed along a corresponding chain line in FIG. 2. In more detail, each side plate 17S contains: the outer upper part fastening portion 21 and side part fastening portion 24 of the first embodiment; an auxiliary fastening portion 50 between the outer upper part fastening portion 21 and the side part fastening portion 24; a projection 51 provided on the outer side of the outer lower part fastening portion 22; and a lower outer fastening portion 52 provided on the projection 51.

The outer upper part fastening portions 21 and 21 and the auxiliary fastening portions 50 and 50 are fastened to the upper rear bulkhead cross-member 12 with the bolts 23, and the side part fastening portions 24 and 24 are fastened to the damper housings 6 and 6 through the bolt fastening brackets 26 and 26. The outer lower part fastening portions 22 and 22 of the side plates 17S and 17S and the lower outer fastening portions 52 and 52 of the projections 51 and 51 are fastened to the lower rear bulkhead cross-member 3 with the bolts 23. The lower central plate 17T is provided with a pair of lower part fastening portions 22 and 22 that are the same as the inner lower part fastening portions 22 and 22 of the first embodiment. In addition, the lower central plate 17T is fastened to the lower rear bulkhead cross-member 3. The side plates 17S and 17S and the lower central plate 17T are coupled to circumference area of the electromagnetic wave shield plate 19' while overlapping one another.

Each side plate 17S includes a plurality of beads, similar to the framework reinforcement plate 17 of the first embodiment. To be specific, the respective beads extend radially from the side part fastening portion 24 positioned near the damper base 7 of the damper housing 6, toward either of the upper rear bulkhead cross-member 12 and the lower rear bulkhead cross-member 3. In addition, each bead is recessed toward the rear. Because the beads have a symmetrical shape, a description will be given of only beads of the side plate 17S and lower central plate 17T of FIG. 12 depicted on the right side of FIG. 12 (the left side of the vehicle body) hereinafter. It should be noted that the same reference numerals are assigned to components of the left side plate 17S which correspond to those of the right side plate 17S.

The right side plate 17S includes an upper outer bead US, an upper inner bead UU, a lower outermost bead SSG, a lower inner bead SU, and a lower outer bead SS. Specifically, the upper outer bead US extends from the side part fastening portion 24 to the upper rear bulkhead cross-member 12 along the side edge of the side plate 17S. The upper inner bead UU is formed along and over a coupling part of the side plate 17S and the electromagnetic wave shield plate 19'. The lower outermost bead SSG extends from the side part fastening portion 24 to the lower rear bulkhead cross-member 3 along the side edge of the side plate 17S. The lower inner bead SU extends along the edge of the electromagnetic wave shield plate 19'. The lower outer bead SS extends downward between the lower outermost bead SSG and the lower inner bead SU. Furthermore, the upper end of the upper inner bead UU reaches the upper inner edge of the side plate 17S, and the upper end of the upper outer bead US reaches the upper outer edge of the side plate 17S. The inner upper part fastening portion 21 is provided at the upper end of the upper inner bead UU, and the outer upper part fastening portion 21 is provided on the inner side of the upper end of the upper outer bead US. The inner upper part fastening portion 21 is provided at an overlap part of the side plate 17S and the electromagnetic wave shield plate 19'.

The lower inner bead SU extends obliquely downward toward the inner side of the side plate 17S along the side edge of the electromagnetic wave shield plate 19', and continues to the lower central plate 17T. Then, the lower inner bead SU further extends obliquely downward, and reaches the lower edge of the lower central plate 17T. The lower outer bead SS extends obliquely downward toward the inner side of the side plate 17S, and reaches the lower edge of the side plate 17S. The inner lower part fastening portion 22 is provided in the lower central plate 17T at the lower end of the lower inner bead SU, and the outer lower part fastening portion 22 is provided in the side plate 17S at the lower end of the lower outer bead SS. The lower outer fastening portion 52 is provided in the side plate 17S at the lower end of the lower outermost bead SSG.

The electromagnetic wave shield plate 19' is provided with a flange 54 in an outer circumferential area thereof, and this flange 54 is coupled to the circumferential edge of the side plates 17S and 17S and the lower central plate 17T. The flange 54 is provided with a plurality of depressions 55 formed at the connecting parts of the side plates 17S and the lower central plate 17T so as to project toward the rear. As illustrated in FIG. 13, after a bottom wall 56 of each depression 55 is placed on a flat portion in the circumferential edge of the side plates 17S and 17S and the lower central plate 17T, the electromagnetic wave shield plate 19' is connected to the side plates 17S and 17S and the lower central plate 17T with spot welding. Here, MIG welding, bolts or rivets may be employed in place of spot welding. Alternatively, the depressions 55 may be provided in the side plates 17S and 17S and the lower central plate 17T, and the flange 54 of the electromagnetic wave shield plate 19' may be formed flat.

In the above second embodiment, the lower inner beads SU continue to the lower central plate 17T. This structure makes it possible to produce advantageous effects of further reducing the weight of the rear bulkhead 16' and reliably suppressing the torsional deformation of the rectangular framework portion K, in addition to the above effect of the first embodiment. Moreover, in the second embodiment, the bottom walls 56 of the depressions 55 provided in the flange 54 of the electromagnetic wave shield plate 19' is connected to the respective flat parts in the inner edge areas of each side plate 17S and the lower central plate 17T. Accordingly, a contact area between each side plate 17S and the lower central plate 17T is decreased, thereby being able to suppress noises caused by vibrations between each side plate 17S and the lower central plate 17T.

The above embodiments are not intended to limit the scope of the present disclosure, and various modifications may be made. For example, a shape of a bulkhead is not limited to those of the embodiments, and an overall shape of a bulkhead may be determined arbitrarily as long as it can cover the front surface of a battery with an electromagnetic wave shield plate. Furthermore, the inner cooling ducts 35 and 35, the cooling fans 36 and 36, and the external ducts 37 and 37 illustrated in FIG. 9 may be arranged along the inner side of the rear wheel housing 4, as indicated by chain lines of FIGS. 1 and 3.

We claim:

1. A structure for mounting a power supply device in a vehicle, comprising:
    a substantially rectangular framework portion including right and left damper housings, an upper cross member extending in a width direction of a vehicle body between the right and left damper housings and connected to the right and left damper housings, and a lower cross member extending in the width direction of the vehicle body between the right and left damper housings and connected to the right and left damper housings;
    a rear bulkhead standing upright and attached to the substantially rectangular framework portion to separate a cabin from a rear trunk;
    a power supply device disposed in the rear trunk while facing the rear bulkhead, the power supply device including an upper surface, a right side surface, a left side surface and a rear surface, each covered by a metal cover; and
    right and left rear frames of the vehicle disposed in the rear trunk, each connected to corresponding one of the right and left damper housings and extending in a longitudinal direction of the vehicle,
    wherein the rear bulkhead includes:
        a framework reinforcement member fixed to and reinforcing the substantially rectangular framework portion, and
        an electromagnetic wave shield member positioned to cover a front surface of the power supply device, the thickness of the electromagnetic wave shield member being smaller than that of the framework reinforcement member,
    wherein each of the right and left damper housings includes a damper base, the framework reinforcement member of the rear bulkhead includes a plurality of protruded beads, and the beads extending radially from a side portion of the rear bulkhead located close to the damper base toward the upper cross member and the lower cross member,
    the power supply device has a width in the width direction of the vehicle body and is disposed in the rear trunk such that the right and left rear flames are positioned under the power supply device, and such that a right widthwise end of the power supply device is supported by the right rear frame and a left widthwise end of the power supply device is supported by the left rear frame.

2. The structure for mounting a power supply device in a vehicle according to claim 1, wherein
    the rear bulkhead is fastened to the substantially rectangular framework portion with a removable fastening tool.

3. The structure for mounting a power supply device in a vehicle according to claim 1, wherein
    the electromagnetic wave shield member of the rear bulkhead is provided with an opening that enables a power switch of the power supply device to be operated therethrough, and
    the opening is covered by a cover member configured to be openable and closable.

4. The structure for mounting a power supply device in a vehicle according to claim 1, wherein
    the framework reinforcement member of the rear bulkhead includes a right side member, left side member and a lower central portion,
    a thickness of the lower central member is smaller than that of the right side member and the left side member, and
    each of right side member and the left side member includes a plurality of beads formed radially, and one or more of the beads extend continuously to the lower central member.

5. The structure for mounting a power supply device in a vehicle according to claim 1, wherein
    one of the framework reinforcement member and the electromagnetic wave shield member of the rear bulkhead includes a depression having a bottom wall, and
    the framework reinforcement member and the electromagnetic wave shield member are fixed to each other while the bottom wall of the one of the reinforcement member and the electromagnetic wave shield member is in contact with the other of the reinforcement member and the electromagnetic wave shield member.

6. The structure for mounting a power supply device in a vehicle according to claim 1, wherein the power supply device is disposed adjacent to the rear bulkhead.

7. The structure for mounting a power supply device in a vehicle according to claim 1, wherein the power supply device further includes an exposed front surface facing the rear bulkhead.

* * * * *